Patented Sept. 16, 1930

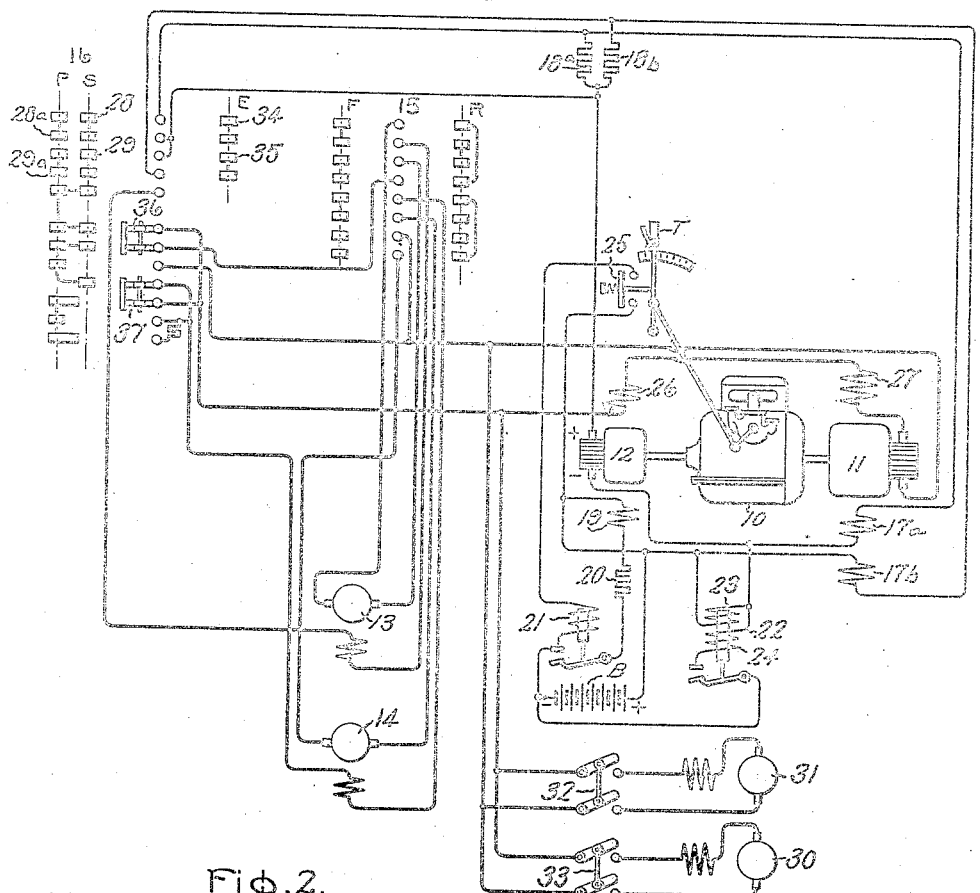

1,776,158

UNITED STATES PATENT OFFICE

RUDOLPH D. KRAPE, OF SCHENECTADY, NEW YORK, ASSIGNOR TO GENERAL ELECTRIC COMPANY, A CORPORATION OF NEW YORK

CONTROL FOR ELECTRIC DRIVES

Application filed August 23, 1926. Serial No. 130,809.

This invention relates to the control of electric drives, and provides improvements therein of special advantage in electric drives for self-propelled vehicles and the like, wherein the driving motors are connected to be energized from a variable voltage electric generator driven by a prime mover such as an internal combustion engine or the like.

In such drives, ordinarily there is no speed regulating or starting resistance for the motors, as the operating speed of the motors is controlled by variation in the voltage of the generator, and by connecting the motors in different operating relations, as for example, in series and parallel. Hence, with such equipment it is desirable, especially in heavy duty service, that the generator voltage always be at a very low value when the driving motors are connected thereto in order to avoid an excessive current flow that may be injurious to the controlling switch mechanism or the other elements of the electrical equipment, as well as impose shocks or strains upon the driving engine or the driven vehicle. Likewise, when the driving motor connections are shifted for operation of the motors in a different speed relation, it is necessary that the generator voltage be limited in value during the transition from the one speed relation to the other for substantially the same reason.

One of the objects of my present invention is to provide an improved arrangement of control apparatus and circuits for insuring that the generator voltage always is limited to a suitable value under the operating conditions previously outlined.

A further object of the invention is to arrange an exciter for the generator in a drive of the above character so that the exciter also may supply current to an auxiliary load such, for example, as a storage battery with the generator either connected or disconnected from its load circuit.

A still further object of the invention is to provide an improved switch mechanism suitable for controlling the interconnection of the driving motors in their various operating relations and having a simple and effective means for electrically isolating or "cutting out" the circuit of any one of the motors that may become disabled during service due to burning out, grounding, or other cause.

Other objects and advantageous features of the invention will be brought out more fully in the following description of the accompanying drawing which illustrates control apparatus for a gas electric vehicle drive embodying the invention in a preferred form. Fig. 1 of the drawing is a schematic diagram of the complete control system for the gas electric drive and Figs. 2 and 3 are enlarged views showing the detailed construction of part of the controlling apparatus.

Referring to Fig. 1, the gas electric drive comprises essentially a suitable internal combustion engine 10, which is connected to drive the direct current generator 11 and the exciter 12, the generator and exciter preferably being mounted directly upon the engine shaft, as indicated in the drawing. The generator 11 supplies current to operate the direct current series wound driving motors 13 and 14 for the vehicle under the joint control of the reversing controller 15, and the series-parallel controller 16. These controllers preferably are of the manually operated drum type, as indicated by the development of the controllers in the drawing.

The principal function of the exciter 12 is to supply energizing current to the generator field windings $17^a$ and $17^b$. In accordance with my present invention, the resistors $18^a$ and $18^b$ are normally connected in the circuit through which the generator field windings $17^a$ and $17^b$ are energized from the exciter 12 and are of sufficiently high resistance value to limit the current supplied to the field windings to a practically negligible value. In this way the voltage of the generator 11 is limited to a very low value as long as the resistors $18^a$ and $18^b$ remain in the field excitation circuit.

The exciter 12 also is arranged so that it may supply current to an auxiliary load comprising the storage battery B which is shown connected to separately excite the field winding 19 of the exciter 12 through a suitable regulating resistor 20 under the control of the electro-magnetic switch 21. The charging of the battery B from the exciter 12 is under the control of a reverse current relay 22 having the voltage responsive winding 23 and the current responsive winding 24.

Operation of the exciter field switch 21 is controlled by the switch 25 which is associated with the throttle lever T of the gas engine 10 in the manner fully described and claimed in Lemp Patent No. 1,589,182, of June 15, 1926. Briefly, the switch 25 is arranged to open the exciter field circuit whenever the gas engine throttle lever T is operated to the idling position. Also the exciter 12 is provided with a differential field winding 26 and the generator 11 is provided with a commutating field winding 27, as described in the Lemp patent.

The operation of the gas electric control embodying my invention is as follows: The engine 10, after being set into operation through the agency of a suitable starting means, such as a Bendix type electric starter, operates the generator 11 and the exciter 12 at idling speed with the throttle lever T in the position in which it is shown in the drawing. The reversing controller 15 may be thrown into either the forward or reversed position F or R, depending upon the direction in which it is desired to operate the drive, and the controller 16 may be thrown into either the series or parallel position, S or P, depending upon whether it is desired to operate the motors in series or in parallel relation. Assuming the controller 15 in the forward position F, and the controller 16 in the series position S, as is ordinarily the case in starting the armature and field windings of the motors 13 and 14 are then interconnected with the generator to produce the desired operation of the drive as soon as excitation is supplied to the generator field windings.

It will be observed that the generator excitation limiting resistors 18$^a$ and 18$^b$ are short circuited respectively by the contact segments 28 and 29, with which the series-parallel controller 16 is provided. Hence, upon advancement of the throttle lever T from the idling position, the speed of the gas engine 10 is increased and at the same time the switch 25 is closed to energize the exciter field switch 21 from the battery B. The closure of switch 21 connects the exciter field winding 19 across the battery B. The resulting excitation of exciter 12 at once produces an exciting current in the field winding 17$^a$ of the generator, and the generator at once starts to supply driving current to the motors 13 and 14. When the voltage of exciter 12 is of a predetermined value, the voltage winding 23 of the reverse current relay 22 is sufficiently energized to close the relay contacts and thereby connect the battery B to be charged from the exciter 12 in series with the generator field winding 17$^b$. The charging circuit may be traced from the positive brush of the exciter through the short circuit around the resistors 18$^b$, and through the generator field winding 17$^b$, to the positive terminal of the battery, thence through the battery, the contact and series winding 24 of the reverse current relay 22 to the negative brush of the exciter.

The differential field winding 26 of the exciter insures that the output of the generator 11 during starting, acceleration, and driving operation of the motors 13 and 14, is always within the capacity of the gas engine 10. This effectively prevents stalling of the gas engine by imposing an excessive load thereon and insures smooth and easy accelerating and driving operation of the motors.

In addition to supplying current to the driving motors 13 and 14, the generator 11 is connected to operate auxiliary apparatus, such as the motor driven blower 30 and the motor driven air compressor 31, the latter preferably being controlled by a suitable pressure governor in the well known manner. The blower is used to ventilate the electrical equipment and the air compressor 31 supplies pressure for operating the pneumatic brakes with which the gas electric locomotive may be provided.

Whenever the operating conditions become such that it is desired to operate the driving motors 13 and 14 in parallel relation to obtain an increased driving speed, this is accomplished by advancing the controller 16 into the parallel position P, thereby reconnecting the armature and field windings of the driving motors 13 and 14 in the desired parallel relation. During the transition from the series connection of the motors 13 and 14 to the prallel connection thereof, it will be observed that as soon as the controller 16 is advanced from the series position, the short circuit around the generator voltage limiting resistors 18$^a$ and 18$^b$ is removed, thereby re-inserting the resistors in the field circuit of the generator. This reduces the excitation of the generator field windings to a negligible value and the generator voltage correspondingly decreases. Thus, when the motors 13 and 14 are connected to the generator 11 in parallel operating relation, there is no appreciable generator voltage applied to the motors. However, at the same time the parallel connection of the driving motors is established, the contacts 28$^a$ and 29$^a$ of the controller 16 once more short circuit the voltage limiting resistors 18$^a$ and 18$^b$ respectively to again permit effective energization of the generator field windings for operation of the driving motors in the parallel relation.

It should be noted that in case the controller 16 is operated to establish the series connection of the driving motors 13 and 14 with the engine throttle controlling lever T advanced from the idling position, substantially the same result is obtained, that is, the voltage limiting resistors 18ª and 18ᵇ effectively prevent energization of the generator field windings 17ª and 17ᵇ from the exciter, and thereby limit the generator voltage to a very low value until the series connections of the driving motors are established. However, as soon as the controller 16 is operated into the series position, the contact segments 28 and 29 short circuit the resistors 18ª and 18ᵇ at the same time the series connections of the motors are established.

Under some conditions it may be desirable to operate the exciter 12 to charge the storage battery with the driving motors disconnected and the vehicle at rest. This is accomplished by operating the controller 16 into the position E and advancing the engine throttle lever T from the idling position. In position E of the controller 16 the contact segments 34 and 35 serve to short circuit the generator voltage limiting resistors 18ª and 18ᵇ so that when the throttle lever is advanced to close the switch 25, the switch 21 is operated to energize the exciter field 19 from the storage battery. With the exciter voltage at the proper value, the reverse current relay 22 is closed in the same manner as previously described to complete the charging circuit for the battery through the generator field winding 17ᵇ. Thus it will be seen that the controller 16 in the operating position E permits the exciter 12 to energize its auxiliary load circuit with the motor load circuit entirely disconnected from the generator 11. The generator field windings 17ª and 17ᵇ, however, are fully energized by the exciter and the generator voltage consequently is of normal value. Thus, the blower 30, as well as the air compressor 31, may be operated from the generator 11 at the same time the battery is charged from the exciter 12 by closing the disconnecting switches 32 and 33.

In case one of the driving motors 13 and 14 should become displaced for any reason, as by burning out, grounding, or short circuiting of the motor windings, my invention permits the circuit of the disabled motor to be isolated, or cut out in a simple and effective manner. This is accomplished by simply raising the contact fingers of the controller 16, which establish the circuit of the disabled motor upon engagement with the movable cooperating contact segments of the controller. Thus, as indicated in Fig. 1, the raising of the pair of controller fingers 36 serves to entirely disconnect the motor 13 from the generator 11, even though the controller 16 is operated into either the series or parallel positions. In the parallel position, however, the circuit of motor 14 is established for operation thereof, even though the motor 13 is cut out. Likewise, raising of the pair of contact fingers 37 serves to isolate the motor 14 in exactly the same way, while permitting operation of the motor 13 with the controller in the parallel position.

Figs. 2 and 3 show more in detail the mechanism whereby the controller fingers are raised and locked in the inoperative position. In Fig. 2 the controller finger 40 is pivotally supported by the shaft 41 upon a base 42, which may be the frame of a magnetic arc blowout, or other suitable supporting member. The contact finger 40 is biased by the spring 43 to move the contact tip 44 of the finger into sliding circuit controlling engagement with the segment 45 of the rotatable controller drum 46. The mechanism for lifting and locking the finger 40 out of contact with the controller segment 45 comprises the lever arm 47, which is pivotally mounted at 48 upon the base 42. The arm 47 carries at its left hand end an operating pin 49 which engages with the contact finger 40 when the lever 47 is moved in a clockwise direction so as to lift the finger against the strain of its biasing spring 43 out of engagement with the controller drum. In order to maintain the finger 40 in its raised position, the lever 47 is provided with a locking detent 50, which is biased by the spring 51 into engagement with cooperating locking notches in the arm 52 so as to firmly lock the lever 49 with the contact 40 in either the raised or the lowered position. As shown in Fig. 2, the detent 50 is in position to lock the lever 47 in an inactive position with the contact finger 40 in normal circuit controlling relation with the controller drum 46. By simply retracting the detent 50 against the bias of the spring 51 and lowering the right hand end of the lever 47, the contact finger 40 may be operated to the raised position in which it is shown in Fig. 3. Upon the release of the detent 50, the lever 47 is effectively locked to maintain the finger 40 in the raised position.

From the foregoing it will be seen that the improvements provided by my invention greatly facilitate the control of electric drives of the character described, the generator voltage always being limited to a safe value prior to the establishment of the motor connections and the exciter being available for charging the storage battery with the driving motors either connected or disconnected and the drive being operative even though one of the driving motors is disabled.

While I have illustrated and described the invention embodied in a preferred form of control apparatus, various changes and modifications may be made without departing from the spirit and scope of the appended claims.

What I claim as new and desire to secure by Letters Patent of the United States, is:

1. In an electric drive, the combination of a generator and a motor, switch mechanism for controlling the energization of the generator field circuit, separately operable switch mechanism for controlling the connection of the generator to the motor for operation thereof, and a resistor arranged to be connected in the generator field circuit under the control of said generator and motor interconnecting switch mechanism for limiting the voltage of the generator upon the disconnection of the motor therefrom independently of said field control switch mechanism.

2. In an electric drive, the combination of a generator and a motor, a drum controller having segments for connecting the generator to the motor for operation thereof, a resistor normally connected in the generator field circuit for limiting the energization thereof, and auxiliary segments on said controller and connections through which the said resistor is short circuited concurrently with the operation of the controller to connect the generator to the motor.

3. The combination of an electric generator, a load circuit for the generator, an exciter for separately energizing the field circuit of the generator, an electrical device arranged to be energized from said field circuit, a resistor normally connected in said circuit for limiting the current therein to a negligible value, and switch mechanism for short circuiting said resistor and selectively effecting the energization of said electrical device separately and jointly with the energization of the generator load circuit.

4. An electric drive comprising a generator, a motor, an exciter for the generator, a resistor normally connected in the excitation circuit of the generator for limiting the current therein to a negligible value, a storage battery for exciting the exciter, automatic switch mechanism for connecting the storage battery to be charged from the exciter when said resistor is ineffective, and a controller and connections controlled thereby for short circuiting said resistor and selectively effecting charging the battery from the exciter separately and jointly with operation of the motor from the generator 5. An electric drive comprising a generator, a plurality of motors adapted to be operated in series and parallel relation from the generator, an exciter for the generator, a resistor normally connected in the excitation circuit of the generator for limiting the voltage generated thereby to a negligible value, a storage battery for exciting the exciter, automatic switch mechanism for connecting the storage battery to be charged from the exciter when said resistor is short circuited, and a controller and connections controlled thereby for short circuiting said resistor and selectively effecting charging of the battery from the exciter separately and jointly with operation of the motors in both series and parallel relation from the generator.

In witness whereof, I have hereunto set my hand this 20th day of August, 1926.

RUDOLPH D. KRAPE.